UNITED STATES PATENT OFFICE 2,670,359

TREATMENT OF STEROID QUATERNARY AMMONIUM SALTS

Percy L. Julian, Maywood, and Edwin W. Meyer, Chicago, Ill., assignors to The Glidden Company, Cleveland, Ohio, a corporation of Ohio No Drawing. Application August 23, 1947, Serial No. 770,336

4 Claims. (Cl. 260—397.5)

The present invention relates to the degradation of steroids, and to the production of unsaturated steroids which have value for further transformation into therapeutically active materials.

As yet no one has degraded the steroid molecule via quaternary ammonium derivatives of tertiary dimethylamines of the cyclopentanopolyhydrophenanthrene series. The discovery of new methods of steroid degradation has been a challenge in view of the need for efficient means for the production of therapeutically active materials. It has been found that certain of the quaternary ammonium compounds are useful in steroid degradation.

It is accordingly an object of the present invention to provide a new method for the degradation of the side chain of steroids.

Another object is to provide a process for degrading the side chain of steroids wherein the products formed contain new centers of reactivity.

Other objects will be apparent to those skilled in the art from the following description.

According to the present invention quaternary ammonium halides of the general formula

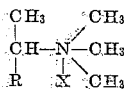

where R is a substituted saturated or unsaturated cyclopentanopolyhydrophenanthrene group, and X is a halogen atom selected from the class consisting of chlorine, bromine and iodine, and the group

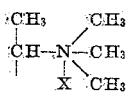

is attached to the 17-carbon atom of the cyclopentanopolyhydrophenanthrene nucleus, are treated with silver hydroxide or alkaline hydroxides under the proper conditions to yield the corresponding quaternary ammonium hydroxides, which on heating either in the presence or absence of alkaline reagents, are converted by loss of trimethylamine and water to 20-pregnenes of the general formula

where R has the connotation above described. The so-formed unsaturated derivative possesses a new double bond involving the carbon atom to which nitrogen was originally attached. This new double bond affords an opportunity for oxidative degradation or the introduction of desired functional groupings through addition reactions or such reactions as allyl halogenation.

The preparation of the 20-pregnenes from the quaternary ammonium halides can be accomplished in a variety of ways. For example, the quaternary halide may be treated with moist silver oxide to form the quaternary ammonium hydroxide which may then be decomposed either by pyrolysis or heating in the presence of alkaline reagents preferably in solution in a hydroxylic solvent such as methanol, ethanol, ethylene glycol or modified glycols. A preferred method of preparation consists in dissolving the quaternary halide in ethylene glycol containing potassium or sodium hydroxide and heating until evolution of trimethylamine ceases. This method is commercially advantageous in that the quaternary halide is converted in one reaction stage to the desired pregnene, the quaternary hydroxide being formed and immediately being decomposed by the same reagent.

The quaternary ammonium halides may be made by reductive methylation of the corresponding primary amine by treatment of the latter with formaldehyde and formic acid to form the dimethylaminosteroid, and the latter then treated with an organic halide such as an alkyl or aralkyl chloride, bromide or iodide.

The following examples are illustrative of the invention.

Example I

A mixture of 3.59 g. of 3-acetoxy-20-amino-5-pregnene, 3.57 g. of 90% formic acid and 35% aqueous formaldehyde solution was heated on the steam bath under reflux for four hours. The mixture was then chilled, made alkaline with dilute sodium carbonate solution and extracted with ether. The ether extract was washed with water several times and dried. The white crystalline residue remaining after removal of solvent was recrystallized from ether-petroleum ether (B. P. 35–60° C.). There resulted 2.1 g., first crop, of crude 3-acetoxy-20-dimethylamino-5-pregnene. More of the amine may be obtained by concentration of the mother liquor. The amine when purified by further recrystallization melts at 184.5–187.5° C.

Example II

A solution of 17.8 g. of 3-acetoxy-20-dimethylamino-5-pregnene in 200 cc. of dry benzene was treated with 12 cc. of methyl iodide. After refluxing for three hours, the semi-solid mass was filtered and washed with anhydrous ether. The mother liquor was retreated with 5 cc. of methyl iodide for an additional crop. There resulted 20.7 g. of 3-acetoxy-5-ternorcholenyltrimethylammonium iodide, M. P. of crude, 260–270° C. with decomposition.

*Example III*

Moist silver oxide from 7.5 g. of silver nitrate was added to a solution of 1.5 g. of 3-acetoxy-5-ternorcholenyltrimethylammonium iodide in 50 cc. of methanol. After standing overnight, the oxide was filtered and washed with methanol. The yellow filtrate was then concentrated in vacuo with the minimum of heating. The residue of quaternary base weighed 1.0 g. This material was pyrolyzed at 210° C. and at 1 mm. pressure. After fifteen minutes at this temperature, the residue was cooled and dissolved in ether. The ether solution was washed with dilute hydrochloric acid followed by water. The dried ether solution upon concentration gave a yellow gum which crystallized from petroleum ether (B. P. 35–60° C.). There resulted 0.2 g. of crude 3-hydroxy-5, 20-pregnene which melted at 134° C. after losing solvent at 113–116° C.

From the hydrochloric acid washes of the ether solution there was recovered 0.5 g. of the hydrochloride of 3-hydroxy-20-dimethylamino-5-pregnene.

*Example IV*

A solution of 2.2 g. of 3-hydroxy-5-ternorcholenyltrimethylammonium iodide in 50 cc. of methanol was mixed with moist silver oxide prepared from 10 g. of silver nitrate. The mixture was then shaken for two hours, filtered and the cake washed with methanol. Nine grams of potassium hydroxide pellets was dissolved in the filtrate and the solution was concentrated until basic vapors were evolved (volume about 15 cc.). The solution was then refluxed for five hours. It was diluted with water and extracted with ether. The ethereal solution was washed with water, dilute hydrochloric acid, water and dried. The crystalline, white residue remaining after removal of solvent from the ether solution weighed 1.0 g. and melted at 136–138° C. (loss of solvent of crystallization at 123–126° C.). After several recrystallizations from methanol the pure 3-hydroxy-5, 20-pregnadiene melted at 138–139.5° C.

*Example V*

A solution of 3.0 g. of 3-acetoxy-5-ternorcholenyltrimethylammonium iodide in 30 cc. of methanol containing 10 g. of potassium hydroxide was refluxed for seven hours. After standing overnight, the reaction mixture was diluted with water and extracted with ether. The ether extract was washed with water, dilute hydrochloric acid, water, then dried and concentrated. There remained 1.0 g. of a white crystalline residue which proved to be 3-hydroxy-5, 20-pregnadiene.

From the hydrochloric acid washes of the ethereal solution, there was recovered 0.3 g. of 3-hydroxy-20-dimethylamino-5-pregnene.

In much the same fashion 3-acetoxy-5-ternorcholenyltrimethylammonium bromide was decomposed to yield 3-hydroxy-5, 20-pregnadiene. The quantity of product was of the same order as described in the instance above.

*Example VI*

A mixture of 7.2 g. of 3-acetoxy-5-ternorcholenyltrimethylammonium iodide, 15 cc. of water containing 14 g. of potassium hydroxide pellets and 55 cc. of ethylene glycol was refluxed for six hours (solution temperature 130–135° C.). Slowly an oil separated and formed an upper layer. After the reaction period, the mixture was chilled and extracted with ether. The ethereal solution was washed with water, dried and treated with enough glacial acetic acid to cause precipitation of basic material. The mixture was allowed to stand in the refrigerator for a short while and filtered. By concentration of the clear filtrate, there resulted 2.8 g. of crude, crystalline 3-hydroxy-5, 20-pregnadiene melting at 130–133° C. The solid which was separated by filtration—the acetate of 3-hydroxy-20-dimethylamino-5-pregnene—weighed 1.3 g.

*Example VII*

The acid chloride was prepared from 7.2 g. of $3(a)$, $12(a)$-diacetoxy bisnor-cholanic acid and 4.2 cc. of thionyl chloride in 20 cc. of dry benzene-40 cc. of dry ether. After one hour the solvent was removed and the acid chloride was dissolved in 130 cc. of acetone. This solution was treated, dropwise, at 0–5° C. with a solution of 2.3 g. of sodium azide in 10 cc. of water. The mixture was stirred for twenty minutes and the azide was precipitated by the addition of 200 cc. of cold water. The solid azide was separated, suspended in 130 cc. of 80% aqueous acetic acid and decomposed by heating to 50–60° C. for one hour. The clear solution was steam distilled, neutralized with dilute sodium carbonate solution and extracted with ether. The washed and dried ether solution gave upon concentration 6.2 g. of crude $3(a)$, $12(a)$-diacetoxy-ternorcholanylamine (acetamide derivative, M. P. 220–221° C.).

The crude amine was methylated by heating 5.2 g. in 6 cc. of 90% formic acid and 4 cc. of 35% aqueous formaldehyde on the steam bath under reflux for four hours. The orange liquid was poured into cold dilute sodium hydroxide and extracted with ether. The ether solution was washed with water, dried and concentrated in vacuo. The resulting amorphous material (5.5 g.) was crystallized from petroleum ether (B. P. 35–60° C.) yielding small needles of $3(a)$, $12(a)$ - diacetoxy - ternorcholanyldimethylamine melting at 134–137° C.

Treatment of the ternorcholanyldimethylamine with methyl iodide in boiling benzene under reflux gave the ether insoluble, solid quaternary methiodide.

*Example VIII*

The crude $3(a)$, $12(a)$-diacetoxy-ternorcholanyldimethylammonium iodide was dissolved in a mixture of 6.0 cc. of water and 30 cc. of ethylene glycol containing 6.0 g. of potassium hydroxide. The mixture was re-refluxed (temperature of boiling solution about 135° C.) for seven and one-half hours, diluted with water and extracted with ether. The ether solution was then washed with water, dilute hydrochloric acid, water and dried. Concentration of the solution gave an amorphous residue. This was dissolved in 10 cc. of acetic acid 3 cc. of acetic anhydride and treated with 1.0 cc. of 5 N perchloric acid in acetic acid at ice-bath temperature and then allowed to stand for thirty minutes. Upon dilution with water, a white crystalline solid separated. This was filtered, washed with water and dried 1.5 g., M. P. 162–175° C. Several recrystallizations from methanol gave large needle-like prisms of $3(a)$, 12(a)-diacetoxy-20-pregnene which melted at 184–185° C.

Oxidation of this pregnene with chromic acid in acetic acid gave the corresponding etiocholanic acid thus proving the constitution of the pregnene.

It will be appreciated that the foregoing examples are merely illustrative and that many modifications may be made therein without departing from the spirit and scope of the invention. For example, in place of the iodides, the chlorides and bromides may be used. These may be prepared by treating the corresponding dimethyl amines with methyl bromide and methyl chloride in substantially the same manner as for the preparation of the quaternary ammonium iodides. The chlorides and bromides may then be converted to the corresponding bases in the same manner as described for the chlorides.

Reference is made to the copending application of ourselves and another Serial Number 773,526, filed September 11, 1947, now Patent No. 2,561,378.

Having described the invention what is claimed is:

1. The process for preparing 20-pregnenes of the general formula R—CH=CH$_2$ where R is cyclopentano - 10,13 dimethylpolyhydrophenanthrene group possessing a double bond at the C$_5$–C$_6$ position, which comprises treating quaternary ammonium halides of the general formula

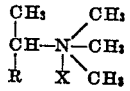

where X is a halogen atom selected from the class consisting of chlorine, bromine and iodine and R is as described above, with an hydroxide selected from the class consisting of silver hydroxide and alkaline hydroxides to form the quaternary ammonium hydroxide, followed by heat decomposition of the quaternary hydroxides to split off trimethyl amine and H$_2$O and to yield the corresponding 20-pregnenes of the formula

R—CH=CH$_2$ wherein R has the same meaning as above.

2. The process of claim 1 in which the quaternary ammonium halides are heated in a hydroxide solvent containing dissolved alkaline hydroxide.

3. The process of claim 2 in which the hydroxylic solvent is ethylene glycol.

4. The process of claim 1 wherein the cyclopentanopolyhydrophenanthrene group of the quaternary ammonium halide has a substituent group at the 3-position selected from the class consisting of hydroxyl and group which yield hydroxyl upon hydrolysis.

PERCY L. JULIAN.
EDWIN W. MEYER.

References Cited in the file of this patent

UNITED STATES PATENTS

| Number | Name | Date |
|---|---|---|
| 2,272,131 | Ruzicka | Feb. 3, 1942 |
| 2,481,524 | MacPhillamy | Sept. 13, 1949 |

OTHER REFERENCES

Ruzicka: Helv. Chim. Acta., 22, 1294–1300 (1939).

Brink: Jour. Biol. Chem. 162, p. 700 (March 1946).